L. FJELSTAD.
AGRICULTURAL MACHINE.
APPLICATION FILED AUG. 9, 1916.
1,214,532.
Patented Feb. 6, 1917.
3 SHEETS—SHEET 2.
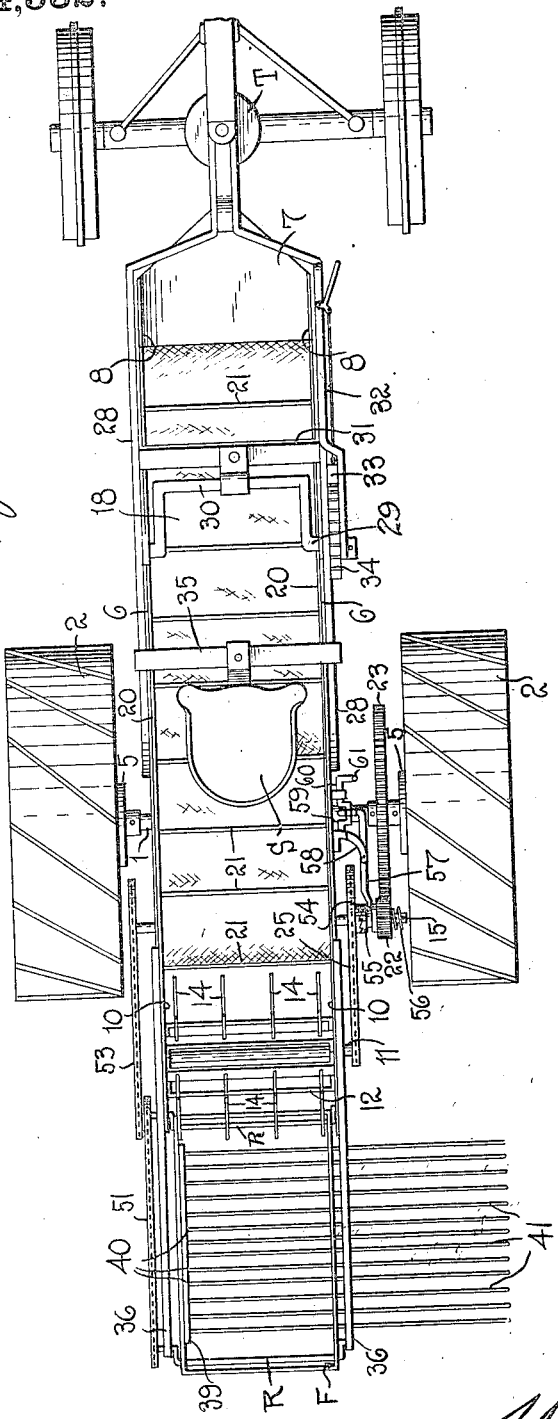
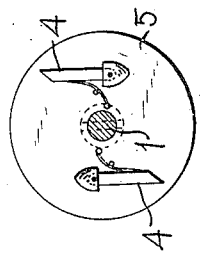
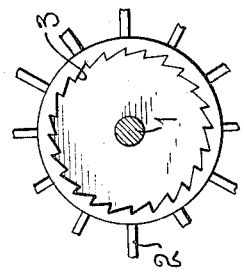
Inventor
L. FJELSTAD
By Watson E. Coleman
Attorney

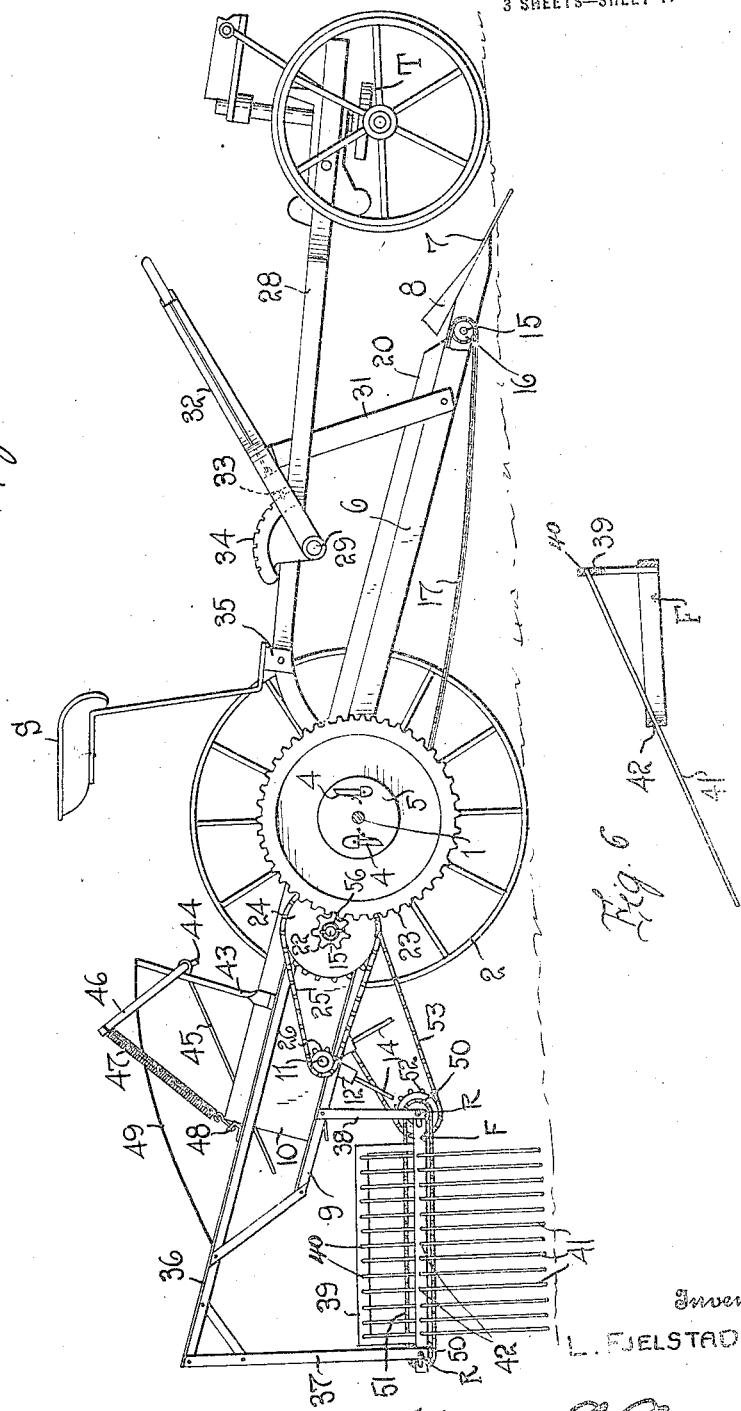
L. FJELSTAD.
AGRICULTURAL MACHINE.
APPLICATION FILED AUG. 9, 1916.
1,214,532.
Patented Feb. 6, 1917.
3 SHEETS—SHEET 1.

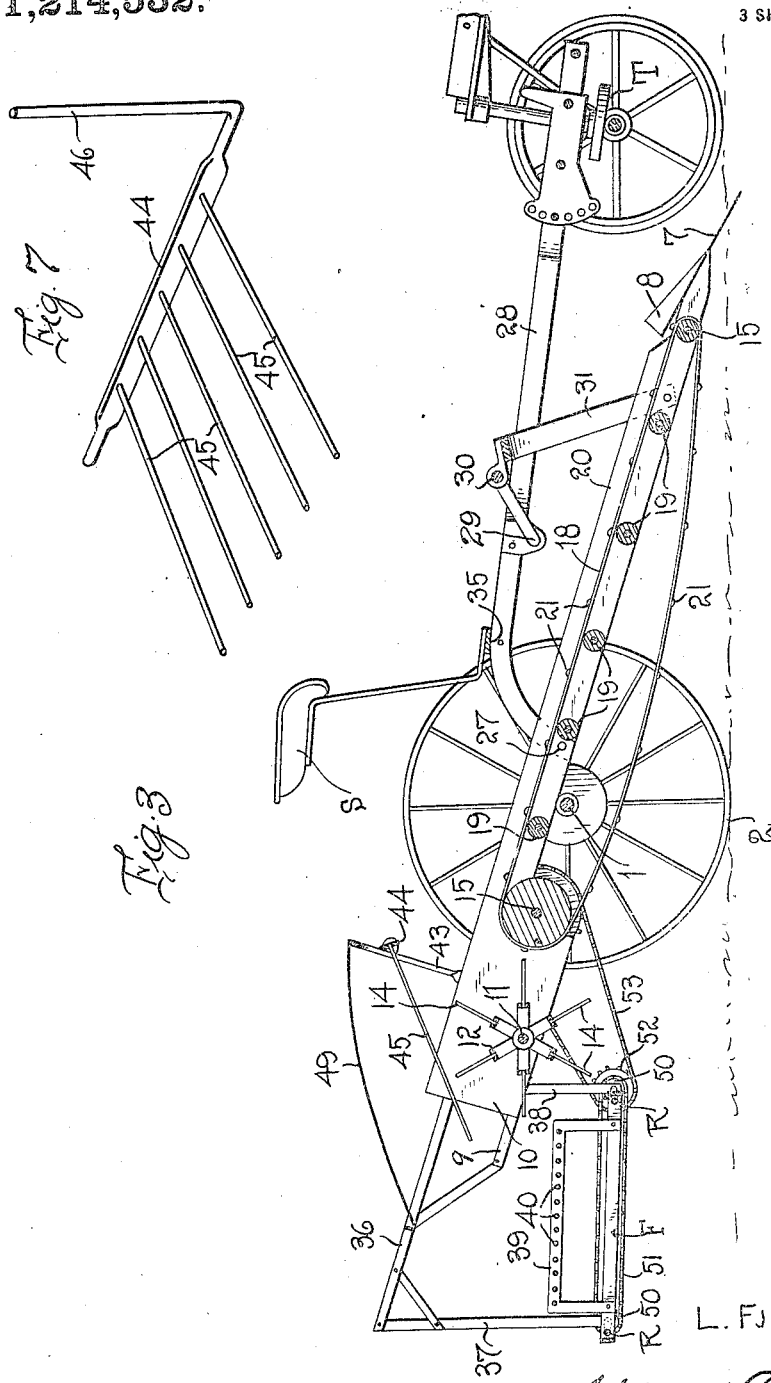

UNITED STATES PATENT OFFICE.

LEWIS FJELSTAD, OF WALLACE, SOUTH DAKOTA.

AGRICULTURAL MACHINE.

1,214,532.  Specification of Letters Patent.  Patented Feb. 6, 1917.

Application filed August 9, 1916. Serial No. 113,991.

*To all whom it may concern:*

Be it known that I, LEWIS FJELSTAD, a citizen of the Dominion of Canada, residing at Wallace, in the county of Codington and State of South Dakota, have invented certain new and useful Improvements in Agricultural Machines, of which the following is a specification, reference being had to the accompanying drawings.

This invention relates to certain improvements in agricultural machines and has relation more particularly to a device of this general character, especially designed and adapted for use in connection with quack-grass and it is an object of the invention to provide novel and improved means whereby the dirt and grass, after being taken from the ground, may be readily and effectively separated one from the other and whereby the grass may be discharged to one side of the machine so that the same may be readily and conveniently gathered.

Furthermore it is an object of the invention to provide a device of this general character including a separating element together with novel and improved means whereby said separating element may be vibrated in order to assure a separation of the grass and dirt.

The invention also has for an object to provide a novel and improved device of this general character wherein a cylinder is interposed between a conveyer leading from a plow or the like and the separating element together with means for holding the grass and dirt to the cylinder to assure its proper delivery upon the separating element.

The invention consists in the details of construction and in the combination and arrangement of the several parts of my improved agricultural machine whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation of an agricultural machine constructed in accordance with an embodiment of my invention; Fig. 2 is a view in top plan of the device as herein set forth; Fig. 3 is a longitudinal vertical sectional view taken through the device as herein disclosed; Fig. 4 is a fragmentary view partly in elevation and partly in section illustrating the hub portion of one of the supporting or traction wheels as herein included; Fig. 5 is a fragmentary view partly in elevation and partly in section illustrating the pawls carried by the supporting axle and which coact with the hub of the supporting wheel; Fig. 6 is a fragmentary view partly in elevation and partly in section of the vibrating element as herein embodied; and Fig. 7 is a view in perspective of the tines as herein set forth, coacting with the cylinder, As disclosed in the accompanying drawings, 1 denotes the main axle of my improved device on which are loosely mounted the supporting or tractor wheels 2. The hub of each of the wheels 2 is provided with the internal ratchet 3 with which coact the dogs 4 carried by a disk 5 fixed to the axle 1 for a purpose which is believed to be clearly apparent to those skilled in the art to which my present invention appertains.

6—6 denote side bars resting upon the axle 1 and capable of rocking movement relatively thereto, and the forward ends of said bars 6 have operatively engaged therewith the digging implement 7 provided adjacent its rear end and at its opposite sides with the upstanding fins or cutting blades 8 to facilitate the operation of the digging implement 7. The portions of the bars 6 rearwardly of the axle 1 have disposed therebeneath the supplemental bars 9 with which are engaged the side plates 10 and in said side plates 10 is rotatably mounted the shaft 11 of the cylinder 12, said cylinder 12 being provided with a plurality of outstanding teeth 14 for a purpose which will be hereinafter more fully set forth.

The opposite end portions of the bars 6 have rotatably mounted therein the shafts 15 provided with the sprockets 16 in mesh with the endless chain 17 secured to the under marginal portions of the endless apron or conveyer 18 which is adapted to carry the quack-grass or the like lifted by the digging implement 7 rearwardly to the cylinder 12. The bars 6 have also interposed therebetween and intermediate the shafts 15 the rollers 19 upon which the upper stretch of the conveyer or apron 18 rests in order to prevent sagging thereof. The bars 6 adjacent the endless conveyer or apron 18 are provided with the upstanding side boards 20 while the outer surfaces of said apron or conveyer 18 are provided with the transverse slats 21 for a purpose which is believed to be self-evident.

The rear shaft 15 has secured to an extended portion thereof a gear 22 in mesh with a gear 23 affixed to an adjacent wheel 2, whereby it will be perceived that as the machine advances the requisite travel will be imparted to the conveyer or apron 18. Said extended portion of the shaft 15 is also provided with a sprocket 24 which is operatively engaged through the medium of the chain 25 with a sprocket 26 affixed to the shaft 11 of the cylinder 12 whereby it will be perceived that the requisite rotation will be imparted to the cylinder 12.

At a predetermined point in advance of the axle 1 the bars 6 have pivotally engaged therewith, as at 27, the draw bars 28 operatively engaged with the forward truck T. Adjacent the forward ends the bars 28 have rotatably supported thereby the shaft 29 having its intermediate portion provided with a crank 30 operatively engaged with the upstanding yoke 31 pivotally engaged with the forward end portions of the bars 6 and preferably at a point in close proximity to the digging implement or plow 7 whereby it will be perceived that upon requisite rocking movement being imparted to the shaft 29, the digging implement or plow may be raised or lowered in accordance with the necessities of practice. As herein embodied, the shaft 29 has fixed to one end thereof the hand lever 32 provided with a latch 33 coacting with the rack 34 extending upwardly from one of the bars 28 whereby it will be perceived that the desired rocking movement may be imparted to the shaft 29 and said shaft effectively maintained in its differing adjustments. The bars 28 are also provided with the cross piece 35 with which the seat structure S is operatively engaged.

The rear ends of the bars 6 are provided with the extensions 36 from the outer ends of which depend the hangers 37 and depending from the rear ends of the supplemental bars 9 are the hangers 38. Mounted in the lower ends of said hangers 37 and 38 are the revolving shafts R which have operatively engaged therewith the separating frame F, whereby it will be perceived that said frame may be vibrated upon requisite movement being imparted to the shafts R. One side of the frame F is provided with an upstanding bracket 39 disposed longitudinally thereof and with which are operatively engaged, as at 40, the upper extremities of the bars or rods 41 which are disposed on an incline of substantially 75° and directed through suitable openings 42 in the opposite side of the frame F and of such a length as to terminate in close proximity to the ground. The cylinder 12 serves to throw the grass upon said rods 41 and as the frame is vibrated it will be readily perceived that the dirt will be separated therefrom and dropped between the rods or bars 41, while the grass or the like will slide downwardly thereof and be delivered to one side of the machine. I also find it of particular advantage to provide the bars 6 at a point in close proximity to the cylinder 12 with the upstanding posts 43 having mounted in their upper ends the rock bar 44 provided with the rearwardly and downwardly inclined tines 45 which serve to hold the grass or the like in operative engagement with the cylinder 12 or more particularly the teeth 14 thereof. As herein disclosed, the rock bar 44 is provided adjacent one end with the upstanding rock arm 46 with which is engaged the retractile member 47 herein disclosed as a coil spring, the opposite end of said member 47 being anchored, as at 48, to the adjacent side bar 6 at a point rearwardly of the rock bar 44 so that the tines 45 will be normally maintained at the limit of their downward movement but capable of yieldable upward movement as the grass or the like passes thereunder. It has also been found of advantage to dispose above the tines 45 and the cylinder 12 the imperforate top or hood 49 to prevent indiscriminate discharge of dirt, as the grass or the like is being carried or discharged by the cylinder 12.

Corresponding ends of the shafts R are provided with the sprockets 50 with which coact the chain 51 whereby it will be perceived that said shafts R will be caused to rotate in unison, and the innermost shaft R is provided with a second sprocket 52 which is operatively engaged through the medium of the chain 53 with the rear shaft 15.

In practice it is desired to have the gear 22 loose upon the shaft 15 but provided with a clutch face 55 adapted to coact with a clutch face 54 carried by the sprocket 24 so that when desired the gear 22 may be adjusted out of operative connection with the sprocket 24 so that the apron 18, cylinder 12, and the frame F of the screening element may be rendered inoperative during the travel of the machine. The gear 22 is normally urged toward the sprocket 24 through the medium of the spring 56.

The gear 22 has coacting therewith the operating lever 57 pivotally supported intermediate its length by the bracket 58 extending laterally from the adjacent side bar 6 and which has its forward extremity operatively engaged with the crank 59 of a shaft 60 disposed longitudinally of the bar 6 whereby it will be seen that upon rocking the shaft 60 in one direction, the gear 22 may be disengaged from the sprocket 24. The forward extremity of the shaft 60 is provided with an operating member 61.

From the foregoing description, it is thought to be obvious that an agricultural machine constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A machine of the character described comprising a body, a digging implement carried by the body, a conveyer carried by the body and leading from the digging implement, a cylinder upon which the conveyer discharges, a rock bar positioned above the cylinder, tines carried by the rock bar and overlying the cylinder, and automatic means for urging the tines toward the cylinder.

2. A machine of the character described comprising a body, a digging implement carried by the body, a conveyer carried by the body and leading from the digging implement, a cylinder upon which the conveyer discharges, a rock bar positioned above the cylinder, tines carried by the rock bar and overlying the cylinder, and yieldable means coacting with the rock bar for urging the tines toward the cylinder.

3. A machine of the character described comprising a body, a digging implement carried by the body, a conveyer carried by the body and leading from the digging implement, a cylinder upon which the conveyer discharges, a rock bar positioned above the cylinder, tines carried by the rock bar and overlying the cylinder, automatic means for urging the tines toward the cylinder, and a screening element supported by the body and upon which the cylinder discharges.

4. A machine of the character described comprising a body, a digging implement carried by the body, a conveyer carried by the body and leading from the digging implement, a cylinder upon which the conveyer discharges, a rock bar positioned above the cylinder, tines carried by the rock bar and overlying the cylinder, automatic means for urging the tines toward the cylinder, and a vibratory screening element carried by the body and upon which the cylinder discharges.

In testimony whereof I hereunto affix my signature in the presence of two witnesses.

LEWIS FJELSTAD.

Witnesses:
G. L. FRANKLIN,
J. G. MCFARLAND.